3,826,628
COATED STEEL PRODUCT

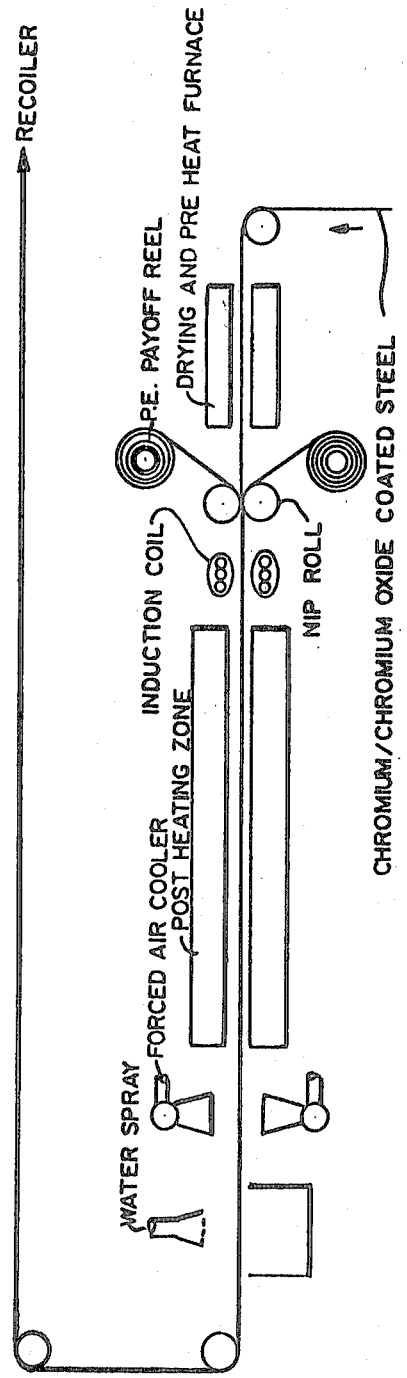

Ramon Leonard Addinall, Stoney Creek, William Trevor Lewis, Burlington, and Otokar Mudroch, Dundas, Ontario, Canada, assignors to The Steel Company of Canada Limited, Hamilton, Ontario, Canada
Original application May 6, 1970, Ser. No. 35,102, now Patent No. 3,679,513, dated July 25, 1972. Divided and this application Apr. 24, 1972, Ser. No. 246,905
Int. Cl. B32b 15/18
U.S. Cl. 29—195                                      6 Claims

ABSTRACT OF THE DISCLOSURE

A coated steel product comprising a steel sheet substrate having a film of lower polyolefin or film of a copolymer of a major amount of a lower olefin with a minor amount of a copolymerizable monomer having polar functional groups coated thereon. The product is characterized by an intermediate layer of chromium/chromium oxide on the substrate on which the polyolefin film has been coated. The product exhibits excellent resistance to corrosion and delamination.

BACKGROUND OF THE INVENTION

1. Field of Invention

This invention relates to a metal substrate having a corrosion resistant coating thereon. In particular, it relates to a steel substrate on which a chromium/chromium oxide film was previously generated having a polymeric organic film coated thereon. This is a divisional of United States Patent Application Ser. No. 35,102, filed May 6, 1970, now Pat. 3,679,513, dated July 25, 1972.

2. Description of Prior Art

While traditionally the plastics and the metals industries have considered themselves to be in competition with one another in the marketing of their products it has been recognized by both factions that metals and plastics have essentially complementary properties. A metal with the corrosion resistance and flexibility of a plastic or a plastic with the rigidity and strength of metal have both been sought. A compromise solution to these problems is a product comprising a metal substrate which is coated with a plastic. The least expensive product fitting this description would be a substrate of the least expensive metal, steel, coated with a film of the least expensive plastic, polyethylene, but this idealised product has been found to be very difficult to prepare. Furthermore, because polyethylene is at least to a certain extent water permeable, such a product would not be completely corrosion resistant.

It is also known to apply a high density layer of polyethylene directly to steel and then apply a low or medium density polyethylene layer to the high density layer. However, the steel must be heated to a sufficiently high temperature for a sufficiently long period of time so that the high density polyethylene is completely melted and so that complete melting occurs in both layers at the junction therebetween. It does not appear that such a method can be carried out as other than a batch process when polyethylene sheeting is employed.

As mentioned above, a polyethylene film is not completely impermeable to water; thin films of low molecular weight polyethylene are more permeable than thick films of high molecular weight. Because of this general property it is doubtful that even the double layer coating of both types as described would be completely impermeable.

One branch of commerce with a direct interest in the development of a metal substrate having an organic coating is the can manufacturing industry. Recently it has been found that a chromium/chromium oxide composite coating is a suitable replacement for tin on steel container stock. There are two preferred methods of applying such a coating to steel: A so-called "two-step" process introduced by the National Steel Corporation of Weirton, West Virginia and a "one-step" process as described in Canadian Pat. 808,630 which issued on Mar. 18, 1969 to Toyo Kohan Co. Ltd. While such a coating exhibits by itself commercially desirable properties, it has been found that applying a further coating of an epoxy-phenolic resin produces a product with a more pleasing finish and which further protects the coating from abrasion. Unfortunately this product is attained with the additional costs of the resin itself and of its application. As a result, epoxy-phenolic systems are recognized as the highest performance/highest cost resin systems available, the "standard of excellence" for the industry.

It can be seen that there is a need for a less expensive replacement for epoxy-phenolic resin as a coating for chromium/chromium oxide coated steel. Polyethylene, being the least expensive plastic, is the natural choice as the most desirable substitute for the epoxy-phenolic resin. Polyethylene is a substantially inert substance which is a useful property in a lining for a beverage can but unfortunately this same chemical inertness makes it difficult to satisfactorily bond it to any substrate. For example, if a film of polyethylene is applied to a metal substrate which is subsequently heated, the film blisters and shrinks and can be readily peeled from the substrate.

While some bonding processes have suceeded in obtaining a satisfactory bonding of polyethylene to a metal substrate such processes have not been a commercial success because of the expense involved. None of these have involved the simple direct application of a single film of polyethylene to a metallic substrate which can be economically carried out on a commercial scale in a continuous line process.

SUMMARY OF INVENTION

We have now found that a film of polyolefin can be applied directly to a chromium/chromium oxide coating after the coating has been heated and the polyolefin film is strongly adhered to the coating. A useful heating cycle was empirically determined whereby lower polyolefins and copolymers of a major amount of a lower olefin with a minor amount of a copolymerizable monomer having polar functional groups could be coated onto a chromium/chromium oxide surface of a steel substrate.

An object of this invention is to provide a process whereby a lower polyolefin or a copolymer of a major amount of a lower olefin with a minor amount of a copolymerizable monomer having polar functional groups can be coated onto steel. This is accomplished through application of a film of polymer to a chromium/chromium oxide coated steel substrate during a controlled heating cycle. The preferred polymeric film of the invention is a polyethylene film.

The product of this invention is a steel substrate coated with chromium/chromium oxide to which is adhered a film of a lower polyolefin or a copolymer of a major amount of a lower olefin with a minor amount of a copolymerizable monomer having polar functional groups. The said product exhibits corrosion resistance and resistance to delamination and peeling comparable to that exhibited by an identical substrate coated with an epoxy-phenolic resin, but can be produced at a lower cost than the latter.

A further feature of the invention is that the substrate coated with a film of copolymer of a major amount of a lower olefin with a minor amount of copolymerizable monomer having polar functional groups exhibits similar corrosion resistance to that of the polyethylene product while having even greater resistance to delamination and peeling.

The product of this invention has many useful applications such as in beverage cans, automobile gas tanks and in laminating sheets of steel together. A sand filled polyethylene coated substrate can be used for roofing or other building materials. The product can be stretched and molded within practical limits without appreciable loss of corrosion resistance or lessening of adhesion of film to substrate.

BRIEF DESCRIPTION OF THE DRAWINGS

FIG. 1 is a schematic diagram of an apparatus for carrying out a preferred embodiment of the process of the invention.

DESCRIPTION OF THE PREFERRED EMBODIMENTS

Figure 3:
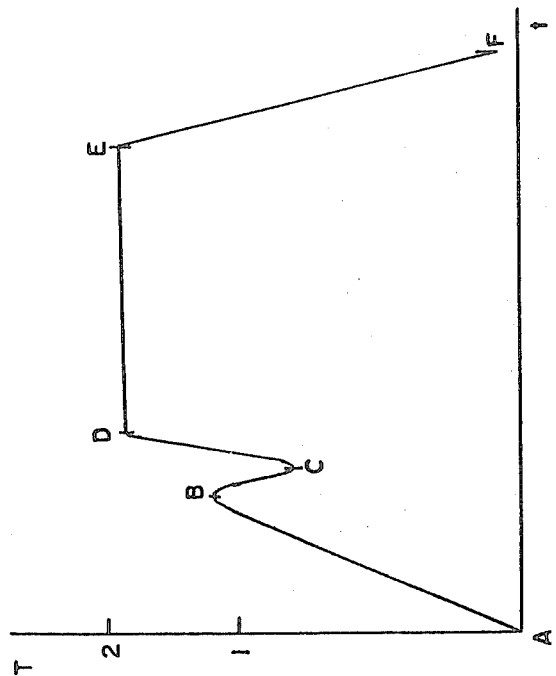
FIG. 3 is a plot of a typical heating profile employed in carrying out the process. Temperature is plotted on the ordinate and time on the abscissa.

The heating cycle shown in FIG. 3 is carried out on the apparatus of FIG. 1 in one embodiment of this invention. The steel strip is first coated (in this instance on both sides) with a chromium/chromium oxide coating in a step not constituting a part of this invention and hence not shown.

Figure 2:
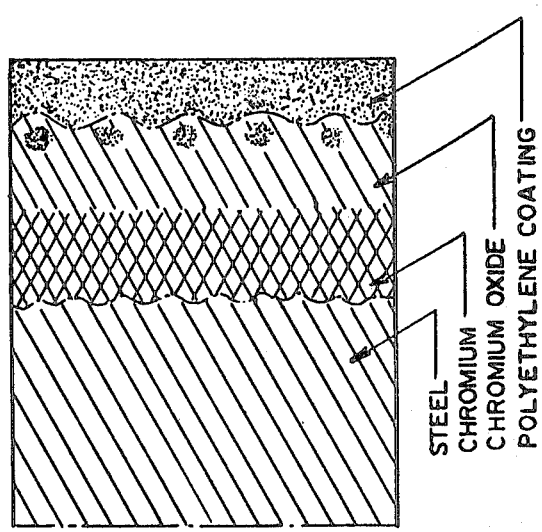
FIG. 2 is a section through the coated product illustrating diagramatically its composition. The drawing is not done to scale.

FIG. 2 shows a section made through the product of this invention. Using standard plating techniques of the tin free steel art such as the "two-step" process of National Steel Corporation or the "one-step" process described in Canadian Pat. 808,630 mentioned above, discreet layers of chromium metal and chromium oxide are formed. The thickness of these layers may be controlled by varying plating bath parameters as is well known in the art.

The layers of metal and of oxide are too thin to be measured by conventional techniques and so thickness is determined by the value in milligrams of chromium that can be leached from one square foot of surface of the substrate; the oxide by leaching with a base, the metal by leaching with an acid. Preferably the layers are of approximately equal thickness, the chromium values for the composite coating varying between above about 0.1 mg./ft.$^2$ to about 15 mg./ft.$^2$. Below 0.1 mg./ft.$^2$ corrosion resistance is unsatisfactory while above about 15 mg./ft.$^2$ possible cohesive failure within the coating will begin to be a concern. The preferred range of values for each layer is above about 1 mg./ft.$^2$ to about 4 mg./ft.$^2$.

Chromium-in-oxide is the accepted trade method for reporting the thickness of the oxide layer of the coating. The chromium oxide consists essentially of $Cr^{+3}$ plus minor amounts of $Cr^{+6}$. To quote the weight or thickness of oxide would be meaningless because the degree of hydration is indefinite and variable. Therefore the chromium-in-oxide value is the total non-metallic chromium leached from the substrate. In this description chromium metal value will refer to the total metallic chromium leached from the substrate.

In the example described below the polyolefin film used is polyethylene, but it is to be understood that the invention is not restricted to this one type of polyolefin film.

The chromium/chromium oxide coated strip first passes through a drying and preheat furnace to bring its temperature up to at least the softening point of the polyethylene, indicated by the numeral 1 on the ordinate of the graph in FIG. 3. This portion of the heating cycle occurs between points A and B of the curve. At B thin films of polyethylene from the two payoff reels are contacted with opposite sides of the steel substrate between the nip rolls. At this point, adhesion of the polyethylene to the coated substrate occurs. The nip rolls are preferably kept well below polyethylene softening temperature and are preferably coated with polytetrafluoroethylene to eliminate the possibility of the polyethylene "tacking" to them. A cooling BC occurs in the heating profile shown, but it is possible to maintain the temperature of the substrate at B by, say, passing an electric current through it without any deleterious effect on the process.

If the upper polyethylene payoff reel and the upper nip roll are removed and the roll over which the coated steel strip passes before entering the preheat furnace lowered so that a pressure is placed on the lower polyethylene film from below by the nip roll and from above by the coated steel the film will still be intimately adhered to the coated steel strip.

Reheating of the coated substrate is represented by CD of the curve in FIG. 3 as the coated substrate passes through the induction coil and attains its maximum temperature at D. This temperature is maintained, as represented by curve DE, in the post heating zone. The residence time in portion DE is widely variable and depends largely on the thickness or the type of the polyethylene film. We have found residence times from 5 to 240 seconds to be satisfactory. In order to ensure the fastest possible line speeds it is preferable to keep this residence time as short as possible.

The maximum temperature attained must be below the degradation point of the polyethylene, indicated by the numeral 2 on the ordinate of the graph in FIG. 3, but the higher the temperature the shorter is the post heating time. The degradation point is the temperature at which the polyethylene begins to smoke and discolour and this temperature varies among types of polyethylenes.

Rapid cooling occurs at EF in the curve. Forced air is used to lower the temperature of the coated substrate to below the softening point; the surface of the film is not roughened by this treatment. Final rapid cooling occurs under the water spray. While it is quite possible to allow the product to cool in still air, maximum line speeds are promoted by the quickest possible cooling and no deterioration of product was observed using this method.

It is difficult to give a numerical value to points 1 and 2 of FIG. 3 as these vary between types of polyethylene. Polyethylene films with the same densities and melt indices but made by different manufacturers have been found to have different values and it is believed that the values are determined by the distribution of molecular weights within the film. In the circumstances, attaching numerical values to points 1 and 2 is not very meaningful, but it has been found that, in general, point 1 should not be below 150° C. and point 2 should not be above 300° C.

A number of polyethylene films have been used with success although the process is preferably carried out using low or medium density polyethylene. It has been found that long residence times in the post heating zone are required when high density polyethylene is used. The thickness of the film may be varied within practical limits and the man skilled in the art may easily determine just what thickness should be used for the purpose he has in mind.

The interface between the polyolefin film and the chromium oxide surface is deliberately indefinitely represented by FIG. 2. It is believed that complete intimate contact of film to oxide surface occurs but the exact nature of the bonding mechanism has not yet been determined. What is known is that the bond is of unusually high strength.

Useful polymeric films which have been coated onto prepared substrates are listed below:

| Code name | Supplier | Film thickness | Remarks |
|---|---|---|---|
| "Surlyn"[1] | Du Pont | 0.002" | Ionomeric. |
| K 505 M[2] | CIL | 0.002" | Melt index 0.5. |
| K 516 L[2] | CIL | 0.003" | Melt index 1.6. |
| K 708[2] | CIL | 0.003" | Melt index 2.0. |

[1] "Surlyn" is a registered trademark of Du Pont for a product described as an ionized olefin copolymer having interchain forces developed between ionized carboxyl groups pendant from an α-olefin chain and common metallic ions.
[2] These are code numbers for three types of polyethylene products supplied by C.I.L. They were chosen arbitrarily and while they are typical of polyethylene films employed, the process of this invention is by no means restricted to the use of these films. It is to be expected that films of both homo- and copolymers of lower olefins can also be employed and the expression "lower polyolefin" used herein is meant to encompass such films.

The special case of "Surlyn" deserves some comment. It was found that this film was firmly coated onto the prepared substrate after only a very short residence time in the post heating zone and that the coated product exhibited corrosion resistance comparable to that of the polyethylene coated substrate. One disadvantageous property of the product is that the film "clouds" when the product is heated to temperatures above 120° F. although such "clouding" does not appear to affect the corrosion resistance of the product.

It was found in a series of tests described below that products using "Surlyn" exhibit corrosion resistance comparable to that of products using polyethylene while at the same time exhibiting resistance to peeling and to delamination superior to that of the polyethylene products.

These observations lead us to predict that copolymers of a major portion of a lower olefin and a minor amount of a copolymerizable monomer having a polar functional group may be more strongly bonded to the substrate than polyethylene. While it may be that such films are more expensive than polyethylene, short residence times in the post heating zone and stronger adhesion properties make products using such films more desirable.

One important embodiment of the process of this invention is to use a polymeric film as an adhesive between two steel substrates whose adjacent faces are coated with chromium/chromium oxide. While polyethylene is itself perfectly adequate as an adhesive it can be seen that it might prove economically advantageous to use "Surlyn" or another similar polymeric film when a stronger laminate is required.

Testing of Properties

The purpose of the following tests is to show that steel substrates coated with chromium/chromium oxide to which polyethylene has been bonded in the manner described has corrosion resistance and resistance to delamination and peeling comparable to lacquered steel now commonly used in the can making industry. While the tests evaluate the product for use in this specific application this was done simply as a matter of convenience and it will be appreciated that these properties can be utilized in many other practical ways. One additional test shows the resistance of the product to the action of gasoline.

Immersion Tests

This experiment tested the resistance of a small sheet of the product to corrosion by leaving a sample X-hatched on one side in various corrosive media for an extended period of time. The edges of the samples were masked to prevent corrosion of bared surfaces.

Note: The following abbreviations are used in the tables below:

P.E.—polyethylene
E—epoxy phenolic lacquer
C.C.—chromium/chromium oxide coated
B.P.—black plate (untreated steel)
Sur—"Surlyn" A

TABLE 1

Time to failure, days

| Corrosive agent | Test control coating | | | Can manufacturer standard | Present invention coating | |
|---|---|---|---|---|---|---|
| | E.-B.P. | P.E.-B.P. | Sur-B.P. | E.-C.C. | P.E.-C.C. | Sur-C.C |
| 3% NaCl | 2 | <1 | <1 | >10 | >10 | >10 |
| 3% HAc | 3 | <1 | <1 | >10 | >10 | >10 |
| 3% NaOH | 3 | <1 | <1 | >10 | >10 | >10 |
| 3% H₃PO₄ | 6 | <1 | <1 | >10 | >10 | >10 |
| 1½% NaCl plus 1½ citric acid | 2 | <1 | <1 | >10 | >10 | >10 |
| Beer | <30 | <30 | <30 | >30 | >30 | >30 |
| Cola [1] | ([2]) | ([3]) | ([3]) | >30 | >30 | >30 |

[1] Failure was undercutting rather than delamination.
[2] 0.5 after 30.
[3] 1 mm. after 30.

Accelerated Weathering Tests

A Cleveland Condensing Humidity Cabinet, Q.C.T. cycle was used to test samples X-hatched and edge masked as above. 12 cycles are considered to be equivalent to approximately 1.5 years of outdoor exposure.

TABLE 2

120° F. (100% relative humidity), percent rusting

| Duration | Test control coating | | | Can manufacturer standard | Present invention coating | |
|---|---|---|---|---|---|---|
| | E.-B.P. | P.E.-B.P. | Sur.-B.P. | E.-C.C. | P.E.-C.C. | Sur-C.C. |
| 1 cycle | 0%, 1.5 mm. undercut | 5%, delamination | 5%, delamination | 0 | 0 | 0 |
| 3 cycles | 5%, 2.5 mm. undercut | | | 0 | 0 | 0 |
| 7 cycles | 10%, delamination | | | 0 | 0 | 0 |
| 12 cycles | | | | 0 | 0 | 0 |

It can be seen from Tables 1 and 2 that the chromium/chromium oxide composite coated steel to which is applied olefin polymers equals the can manufacturing industry standard (E.-C.C.) in terms of corrosion resistance.

Drawability

It was found that the porosity of P.E.-C.C. was not changed by drawing within the limits of what the metal will stand.

Physical Adhesion

A scrape adhesion test, ASTM D 2197–67T, showed comparable values for P.E.-C.C. and for E.-C.C.

A 180° peel adhesion test was carried out on P.E.-C.C. It showed consistent peel values greater than 40 lbs./¾" strip. The standard minimum acceptable peel for lacquered can manufacturing stock is 40 lbs., but this arbitrary figure already represents a large safety factor and it is more meaningful to point out that peel values of less than 10 lbs./¾" strip indicate poor adhesive strength. Examination of peeled P.E.-C.C. samples indicated that cohesive rather than adhesive failure had, in general, occurred.

In summary, the above tests show that the product of this invention has properties which meet the standards set by the can manufacturing industry and that it is a suitable replacement for the lacquer-coated canning stock now widely used.

Gasoline Immersion

Samples of Sur-C.C., P.E.-C.C. and terne plate (traditional material for gasoline tanks) were exposed to gasoline at various temperatures over various periods of time in a Soxhlet extractor which produces a flushing action on the sample. Additionally static immersion tests at room temperature were performed. Low octane rating commercial grade gasoline containing one percent distilled water was employed to simulate a fuel with high moisture content.

The terne plate did not show significant change in exposure up to boiling temperature and over a long period of time. Both Sur-C.C., and P.E.-C.C. exhibited no loss of adhesion exposed at temperatures below 120° F. and no change in colour due to corrosion. "Surlyn" showed a faint white milkiness at 130° F. One minor disadvantage was that the polyethylene exhibited a fairly constant rate of loss of weight at temperatures up to 120° F. At higher temperatures dissolution rates became significant and the polyethylene dissolved rapidly in boiling gasoline. It appears that this product cannot be used in gasoline at temperatures in excess of 120° F., but as polyethylene filler pipes are used commercially, this does not appear to be a practical limitation.

The use of our product as gasoline tanks offers several advantages. The P.E.-C.C. sheet can be bent and drawn to a desired shape without loss of corrosion resistance. Two halves of a tank can be pressed together and an excellent seal attained by melting and then cooling the adjacent polyethylene films at the joint.

What we claim is:
1. A coated steel product comprising
   (a) a steel substrate,
   (b) a chromium/chromium oxide composite coating on the steel substrate, the composite coating comprising
      (1) adjacent the steel substrate a chromium metal layer having a chromium metal value between above about 0.1 mg./ft.$^2$ to about 15 mg./ft.$^2$, and
      (2) adjacent the chromium metal layer a chromium oxide layer having a chromium-in-oxide value between above about 0.1 mg./ft.$^2$ to about 15 mg./ft.$^2$ said composite coating having a total chromium value above about 0.1 mg./ft.$^2$ to about 15 mg./ft.$^2$,
   (c) a substantially smooth surface layer adhered to the chromium oxide layer, the surface layer comprising a polymeric film, the polymeric film being a film of a lower polyolefin or a copolymer of a major amount of a lower olefin with a minor amount of a copolymerizable monomer having a polar functional group.

2. A coated steel product according to claim 1 wherein said chromium metal value and said chromium-in-oxide value are each from above about 1 mg./ft.$^2$ to about 4 mg./ft.$^2$.

3. A coated steel product according to either claim 2 wherein said polymeric film is polyethylene.

4. A coated steel product according to either claim 2 wherein said polymeric film is an ionized olefin copolymer in which interchain forces are developed between ionized carboxyl groups pendant from an α-olefin chain and common metallic groups.

5. A coated steel product comprising
   (a) a first steel substrate
   (b) a chromium/chromium oxide composite coating on said steel substrate, the composite coating comprising
      (1) adjacent the steel substrate a chromium metal layer having a chromium metal value between above about 0.1 mg./ft.$^2$ to about 15 mg./ft.$^2$, and
      (2) adjacent the chromium metal layer a chromium oxide layer having a chromium-in-oxide value between above about 0.1 mg./ft.$^2$ to about 15 mg./ft.$^2$, said composite coating having a total chromium value above about 0.1 mg./ft.$^2$ to about 15 mg./ft.$^2$,
   (c) a polymeric film adhered to said chromium oxide layer surface, the polymeric film being a film of a copolymer of a major amount of a lower olefin with a minor amount of a copolymerizable monomer having a polar functional group,
   (d) a second steel substrate having a composite coating according to (b), said polymeric film in (c) being adhered to said composite coating on said second steel substrate.

6. A coated steel product according to claim 5 wherein said chromium/chromium oxide composite coating has both a chromium metal value and a chromium-in-oxide value of from above about 1 mg./ft.$^2$ to about 4 mg./ft.$^2$.

References Cited

UNITED STATES PATENTS

| | | | |
|---|---|---|---|
| 3,245,577 | 4/1966 | Virzi | 29—195 P X |
| 3,419,414 | 12/1968 | Marks | 117—71 M X |
| 3,479,162 | 11/1969 | Yanabu et al. | 29—195 T |
| 3,526,486 | 9/1970 | Smith et al. | 29—195 T X |
| 3,634,147 | 1/1972 | Helwig et al. | 29—195 T X |
| 3,671,205 | 6/1972 | Uchida et al. | 29—195 T |

HYLAND BIZOT, Primary Examiner

E. L. WEISE, Assistant Examiner

U.S. Cl. X.R.

117—71 M